UNITED STATES PATENT OFFICE.

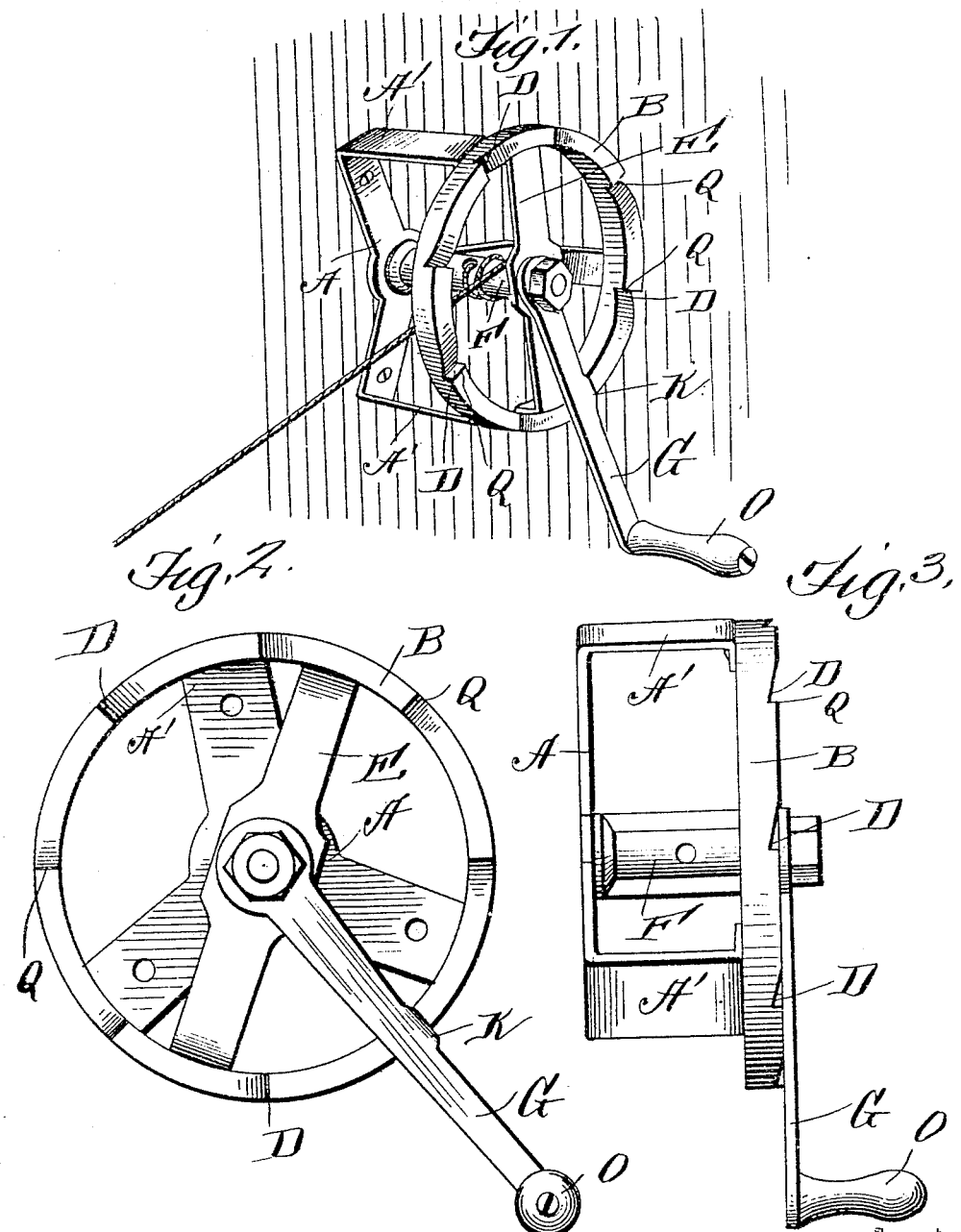

OMAR C. CLAYPOOL, OF PRINEVILLE, OREGON.

CLOTHES-LINE REEL.

No. 875,778.   Specification of Letters Patent.   Patented Jan. 7, 1908.

Application filed July 1, 1907. Serial No. 381,694.

*To all whom it may concern:*

Be it known that I, OMAR C. CLAYPOOL, a citizen of the United States, residing at Prineville, in the county of Crook and State of Oregon, have invented certain new and useful Improvements in Apparatus for Holding Clothes-Lines Taut; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in apparatus for holding clothes lines taut and consists essentially in the provision of a reel mounted in a frame adapted to be fastened to any fixed object, and in the provision of a handle which is fixed to the reel and made of a resilient material and having a lip adapted to turn over a serrated face of the frame and engage in one or another of the notches or teeth formed therein for the purpose of holding the line which is wound upon the reel taut.

The invention comprises various other details of construction and combinations and arrangements of parts which will be hereinafter fully described and then specifically defined in the appended claims.

I illustrate my invention in the accompanying drawings in which:—

Figure 1 is a perspective view showing my improved apparatus for holding clothes lines as adjusted to the side of a house and having a clothes line attached thereto. Fig. 2 is an enlarged detail perspective view of the frame showing the serrations upon the face thereof and the manner of engagement of the reel handle with the notches upon the frame, and Fig. 3 is an edge view of the frame.

Reference now being had to the details of the drawings by letter, A designates a metallic frame having arms A' which are integral therewith and bent at angles and to the outer ends of said arms is fastened a ring B, having in its outer face a series of notches or serrations D. E designates a cross piece within said ring, and F designates a reel which is journaled at one end in an aperture in said cross picee and its other end in said metallic frame.

G designates the shank portion of a handle, made preferably of a resilient metal, and is fixed to the reel shaft outside said cross piec of the ring, said shank being held by any suitable means upon the reel, as by a nut which is mounted upon the threaded end of the spindle of the reel.

K designates an integral lip upon the shank portion of the handle which is bent laterally at a slight angle and is adapted to contact with the serrated face of said ring and, when said lip comes opposite a notch or serration, the natural resiliency of the shank portion of the handle will cause said lip to enter one or another of the notches or serrations and upon a further rotary movement of the shank by turning the handle O said lip may be moved from one notch to another. It will be noted that each notch terminates in a shoulder Q, thereby preventing a reverse rotary movement to the handle, each shoulder serving as a stop to hold the reel with the rope wound thereon. In the event of its being desired to unreel the rope, it may be done by pulling the shank portion of the handle, which is made of a resilient material, out of the path of said notches and turning the same backward.

In operation, the frame referred to is preferably fastened to a fixed object, such as the wall of a house or post, and the clothes line wound about the reel. In the event of excessive weight being put upon the clothes line, causing the latter to sag and become slack, the line may be quickly made taut by giving a rotatory or partially rotary movement to the reel by means of said handle and the line held in as taut a relation as may be desired, the lip upon the shank portion of the handle catching in one of the notches to hold the perches.

What I claim to be new is:—

1. An apparatus for holding clothes lines taut comprising a ratchet ring, a diametrically disposed cross piece fastened to said ring provided with an aperture therein, a stationary support for said ring, a reel journaled in said support and in the aperture of said cross piece and upon which a line is adapted to be wound, a handle bar fixed to said shank and adapted to engage the teeth of the ratchet ring, as set forth.

2. An apparatus for holding clothes lines taut comprising a ratchet ring, a diametrically disposed cross piece fastened to said ring provided with an aperture therein, a spider member having angled arms, the ends of which are fastened to said ring, a shaft journaled in said member and also in the aperture of said cross piece and upon which a line is adapted to be wound, a resilient handle bar fixed to said shaft and adapted to be normally in engagement with the teeth of the ratchet ring, as set forth.

3. An apparatus for holding clothes lines taut comprising a ratchet ring, a diametrically disposed cross piece fastened to said ring provided with an aperture therein, a spider member having angled arms, the ends of which are fastened to said ring, a shaft journaled in said member and also in the aperture of said cross piece and upon which a line is adapted to be wound, a resilient handle bar fixed to said shaft, a portion of said bar being bent at an angle to form a catch for engagement with the teeth of said ring, as set forth.

In testimony whereof I hereunto affix my signature in the presence of two witnesses.

OMAR C. CLAYPOOL.

Witnesses:
WILLIAM WIGLE,
RALPH SHARP.